US012585404B2

(12) United States Patent
Yeon et al.

(10) Patent No.: US 12,585,404 B2
(45) Date of Patent: Mar. 24, 2026

(54) STORAGE DEVICE PERFORMING COPY OPERATION IN BACKGROUND AND OPERATING METHOD THEREOF

(71) Applicant: SAMSUNG ELECTRONICS CO., LTD., Suwon-si (KR)

(72) Inventors: Jesuk Yeon, Suwon-si (KR); In Hwan Doh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/738,832

(22) Filed: Jun. 10, 2024

(65) Prior Publication Data

US 2025/0138746 A1 May 1, 2025

(30) Foreign Application Priority Data

Oct. 27, 2023 (KR) ........................ 10-2023-0146044

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
CPC .... G06F 3/0655; G06F 3/0604; G06F 3/0679; G06F 2212/7201; G06F 3/0611; G06F 3/065; G06F 3/0659; G06F 12/0246; G06F 3/0629; G06F 12/023; G06F 3/0658; G06F 2212/1016
USPC ....................................................... 711/154
See application file for complete search history.

(56) References Cited

U.S. PATENT DOCUMENTS

| | | | |
|---|---|---|---|
| 9,009,437 B1 * | 4/2015 | Bjornsson | G06F 3/0641 |
| | | | 718/1 |
| 10,915,448 B2 | 2/2021 | Velayuthaperumal et al. | |
| 11,681,463 B2 | 6/2023 | Li et al. | |
| 2005/0188251 A1 * | 8/2005 | Benhase | G06F 11/2069 |
| | | | 714/6.1 |

(Continued)

FOREIGN PATENT DOCUMENTS

| | | |
|---|---|---|
| EP | 1669849 B1 | 7/2014 |
| KR | 10-2022-0014272 A | 2/2022 |

OTHER PUBLICATIONS

Communication dated Feb. 7, 2025 issued by the European Patent Office in European Patent Application No. 24208124.8.

*Primary Examiner* — Sherief Badawi
(74) *Attorney, Agent, or Firm* — Sughrue Mion, PLLC

(57) ABSTRACT

An operating method of a storage device which includes a nonvolatile memory device and a controller controlling the nonvolatile memory device includes receiving, by the controller from a host device, a first logical address of a source range entry, a second logical address of a destination range entry, and a first copy command including a first flag that indicates a background copy is set, mapping, at the controller, a first physical address on the second logical address, mapping, at the controller, a second physical address on the second logical address and/or the first physical address, transmitting, by the controller to the host device, a first notification of a completion of the first copy command, and after the controller transmits the first notification, reading, at the nonvolatile memory device, first data stored at the first physical address and writing the first data at the second physical address.

19 Claims, 13 Drawing Sheets

(56)                    References Cited

U.S. PATENT DOCUMENTS

2006/0085609  A1*   4/2006  Ninose ................ G06F 11/2082
                                                    714/E11.102
2011/0191554  A1*   8/2011  Sakai .................... G06F 3/0689
                                                    711/E12.103
2012/0173792  A1*   7/2012  Lassa ................... G06F 3/0688
                                                    711/E12.008
2014/0108750  A1*   4/2014  Brown ................ G06F 11/1451
                                                    711/E12.103
2014/0108752  A1*   4/2014  Brown ................ G06F 11/1458
                                                    711/E12.103
2014/0108757  A1*   4/2014  Brown ................. G06F 12/023
                                                    711/162
2014/0214977  A1*   7/2014  Buchko .................. H04L 51/23
                                                    709/206
2014/0331238  A1*   11/2014  Liang ..................... G06F 9/542
                                                    719/320

2020/0081629  A1*   3/2020  Brown ................. G06F 3/0673
2020/0081801  A1*   3/2020  Brown .................. G06F 3/067
2020/0218451  A1    7/2020  Hashimoto
2021/0223979  A1*   7/2021  Li .......................... G06F 3/0604
2021/0405921  A1*   12/2021  Venkatanarayanan .......................
                                                    G06F 3/0635
2022/0035530  A1*   2/2022  Vikram Singh ...... G06F 3/0659
2022/0035564  A1    2/2022  Vikram Singh et al.
2022/0075560  A1    3/2022  Segev et al.
2022/0342553  A1*   10/2022  Gyllenskog ........... G06F 3/0616
2023/0091948  A1*   3/2023  Venkatanarayanan .......................
                                                    G06F 3/0622
                                                    711/154
2023/0137938  A1    5/2023  Yang
2023/0359552  A1*   11/2023  Zhao ................... G06F 12/0246
2024/0103729  A1*   3/2024  Mallick .................. G06F 3/067
2024/0202135  A1*   6/2024  Yoshida ............. G06F 12/1009
2025/0103207  A1*   3/2025  Subramanian ........ G06F 3/0631

* cited by examiner

300

| DWORD 0 | Command ID, Copy Command OPCODE |
|---------|--------------------------------|
| DWORD 1 | Data Pointer (DPTR) |
| DWORD 2, 3 | Starting Destination LBA (SDLBA) |
| DWORD 4 | Number of Ranges (NR) |
| DWORD 5 | Background Copy Flag (BGCF) |

SRE

Source LBA (SLBA)

| LA | 1st PA |
|---|---|
| LBA 01 | PA a |
| LBA 02 | PA b |
| LBA 03 | - |
| LBA 04 | - |

| LA | 1st PA |
|---|---|
| LBA 05 | PA e |
| LBA 06 | PA f |
| LBA 07 | - |
| LBA 08 | - |

Destination LBA (DLBA)

| LA | 2nd PA |
|---|---|
| LBA 09 | - |
| LBA 10 | - |
| LBA 11 | - |
| LBA 12 | - |

Physical NVM

| 1st PA | DATA | 2nd PA | DATA |
|---|---|---|---|
| PA a | DT a | PA i | - |
| PA b | DT b | PA j | - |
| PA c | - | PA k | - |
| PA d | - | PA l | - |

| 1st PA | DATA |
|---|---|
| PA e | DT e |
| PA f | DT f |
| PA g | - |
| PA h | - |

FIG. 6B

Physical NVM

| 1st PA | DATA | 2nd PA | DATA |
|--------|------|--------|------|
| PA a | DT a | PA i | - |
| PA b | DT b | PA j | - |
| PA c | - | PA k | - |
| PA d | - | PA l | - |

| 1st PA | DATA |
|--------|------|
| PA e | DT e |
| PA f | DT f |
| PA g | - |
| PA h | - |

Destination LBA (DLBA)

| LA | 1st PA | 2nd PA |
|------|--------|--------|
| LBA 09 | PA a | PA i |
| LBA 10 | PA b | PA j |
| LBA 11 | PA e | PA k |
| LBA 12 | PA f | PA l |

Source LBA (SLBA)

| LA | 1st PA |
|------|--------|
| LBA 01 | PA a |
| LBA 02 | PA b |
| LBA 03 | - |
| LBA 04 | - |

| LA | 1st PA |
|------|--------|
| LBA 05 | PA e |
| LBA 06 | PA f |
| LBA 07 | - |
| LBA 08 | - |

FIG. 6C

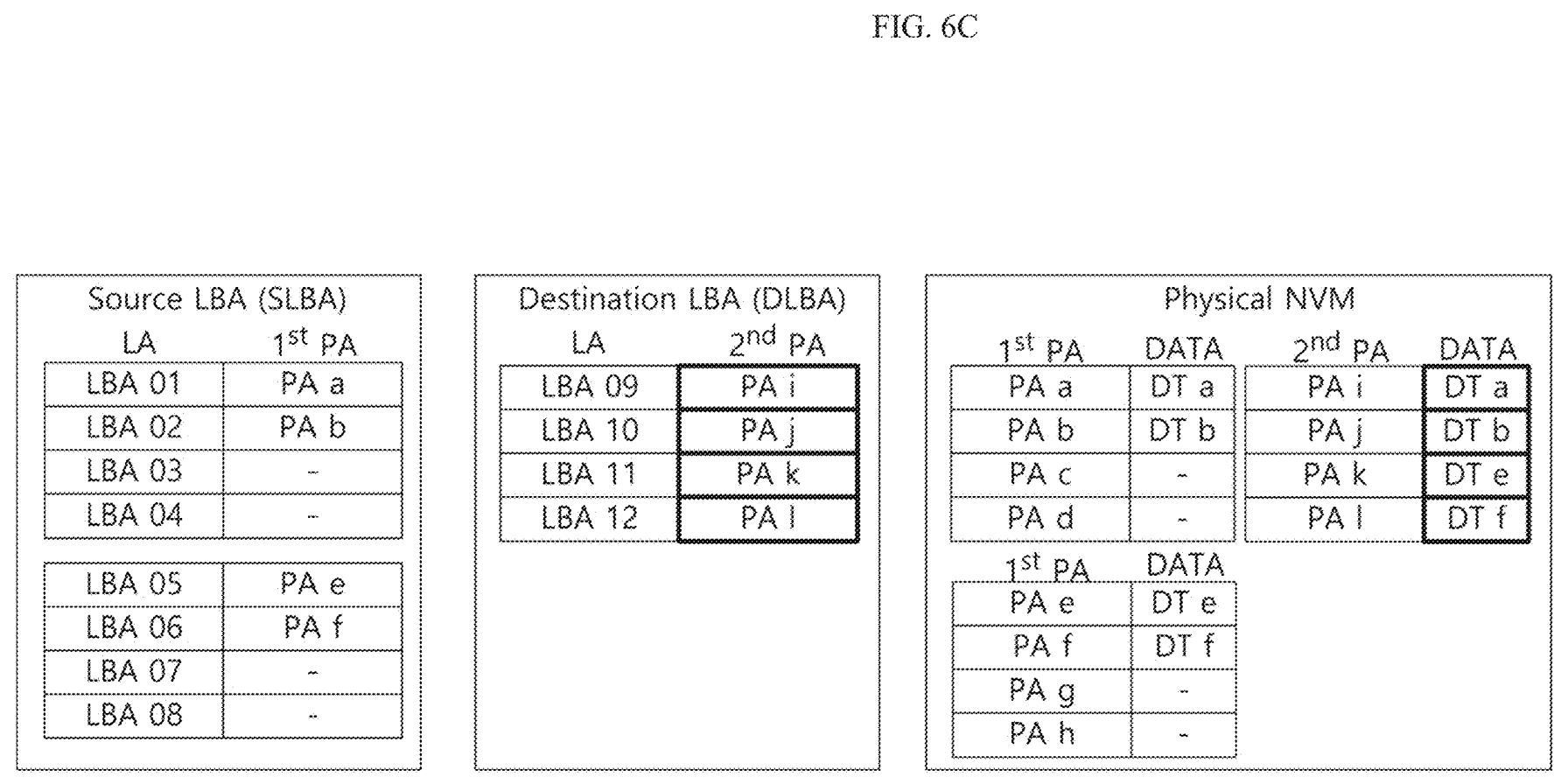

Source LBA (SLBA)

| LA | 1st PA |
|---|---|
| LBA 01 | PA a |
| LBA 02 | PA b |
| LBA 03 | - |
| LBA 04 | - |

| LA | 1st PA |
|---|---|
| LBA 05 | PA e |
| LBA 06 | PA f |
| LBA 07 | - |
| LBA 08 | - |

Destination LBA (DLBA)

| LA | 2nd PA |
|---|---|
| LBA 09 | PA i |
| LBA 10 | PA j |
| LBA 11 | PA k |
| LBA 12 | PA l |

Physical NVM

| 1st PA | DATA |
|---|---|
| PA a | DT a |
| PA b | DT b |
| PA c | - |
| PA d | - |

| 1st PA | DATA |
|---|---|
| PA e | DT e |
| PA f | DT f |
| PA g | - |
| PA h | - |

| 2nd PA | DATA |
|---|---|
| PA i | DT a |
| PA j | DT b |
| PA k | DT e |
| PA l | DT f |

200

STORAGE DEVICE PERFORMING COPY OPERATION IN BACKGROUND AND OPERATING METHOD THEREOF

CROSS-REFERENCE TO RELATED APPLICATION

This application claims priority under 35 U.S.C. § 119 to Korean Patent Application No. 10-2023-0146044 filed on Oct. 27, 2023, in the Korean Intellectual Property Office, the disclosure of which being incorporated by reference herein in its entirety.

BACKGROUND

Devices, apparatuses and methods consistent with the present disclosure relate to a storage device executing a copy command in the background.

A nonvolatile memory device which is a kind of semiconductor memory device includes a flash memory device. The nonvolatile memory device may be used as a non-transitory storage device.

A non-volatile memory host controller express (NVMe) which is one of interface protocols supports various command sets, and a copy command is supported as one of the command sets.

SUMMARY

It is an aspect to provide a storage device efficiently executing a copy command by performing read and write operations associated with the copy command in the background after notifying the host device that the copy command is completely executed.

According to an aspect of one or more embodiments, there is provided an operating method of a storage device which includes a nonvolatile memory device and a controller controlling the nonvolatile memory device, the operating method comprising receiving, by the controller from a host device, a first logical address of at least one source range entry, a second logical address of one destination range entry, and a first copy command including a first flag that indicates a background copy is set; based on the first flag indicating that the background copy is set, mapping, at the controller, a first physical address on the second logical address; mapping, at the controller, a second physical address on at least one of the second logical address and the first physical address; transmitting, by the controller to the host device, a first notification of a completion of the first copy command; and after the controller transmits the first notification, reading, at the nonvolatile memory device, first data stored at the first physical address and writing the first data at the second physical address.

According to another aspect of one or more embodiments, there is provided a storage device comprising at least one nonvolatile memory device configured to store or read data; and a controller configured to control the at least one nonvolatile memory device and to execute a command provided from a host device. The controller is configured to at least receive, from the host device, a first logical address of at least one source range entry, a second logical address of one destination range entry, and a first copy command including a first flag that indicates a background copy is set; map a first physical address on the second logical address based on the first copy command; map a second physical address on at least one of the second logical address and the first physical address; transmit a first notification of a completion of the first copy command to the host device; after the first notification is transmitted, read first data stored at the first physical address; and write the first data at the second physical address.

According to yet another aspect of one or more embodiments, there is provided a storage device comprising at least one nonvolatile memory device configured to store or read data; and a controller configured to control the at least one nonvolatile memory device and to execute a command provided from a host device. The controller is configured to at least receive a copy command including a flag indicating that a background copy is set, from the host device; based on the copy command, update a mapping table in which logical addresses and physical addresses are mapped in a one-to-one correspondence; after updating the mapping table, transmit a complete notification of the copy command to the host device; and after transmitting the complete notification, control the at least one nonvolatile memory device to perform data read operations or data write operations corresponding to the copy command.

BRIEF DESCRIPTION OF THE FIGURES

The above and other aspects will become apparent by describing in detail embodiments thereof with reference to the accompanying drawings, in which:

FIG. 5 is a diagram illustrating a configuration of a copy descriptor inserted into a copy queue of a controller according to an embodiment;

FIGS. 6A to 6C are diagrams illustrating how a mapping table changes as a storage device of FIG. 1 executes a copy command, according to some embodiments;

DETAILED DESCRIPTION

To access a nonvolatile memory device, a host device communicates with a controller of a storage interface in compliance with the interface protocol.

A controller of a related art storage device which supports a copy command of the NVMe performs a read operation on a source range entry targeted for the copy command and writes a result of the read operation at a target address. After operations associated with all the source range entries targeted for the copy command are completed, the related art storage device notifies the host device that the copy command is completely executed. Accordingly, the overhead of communication is reduced compared to the case where the host device directly performs the above operations with the nonvolatile memory device through the read command and the write command. However, it is not efficient to notify the host device that the copy command is completely executed after the internal read and write operations of the storage device associated with the copy command are completed.

Below, various embodiments will be described in detail and clearly to such an extent that an ordinary one in the art easily carries out the various embodiments.

Figure 1:
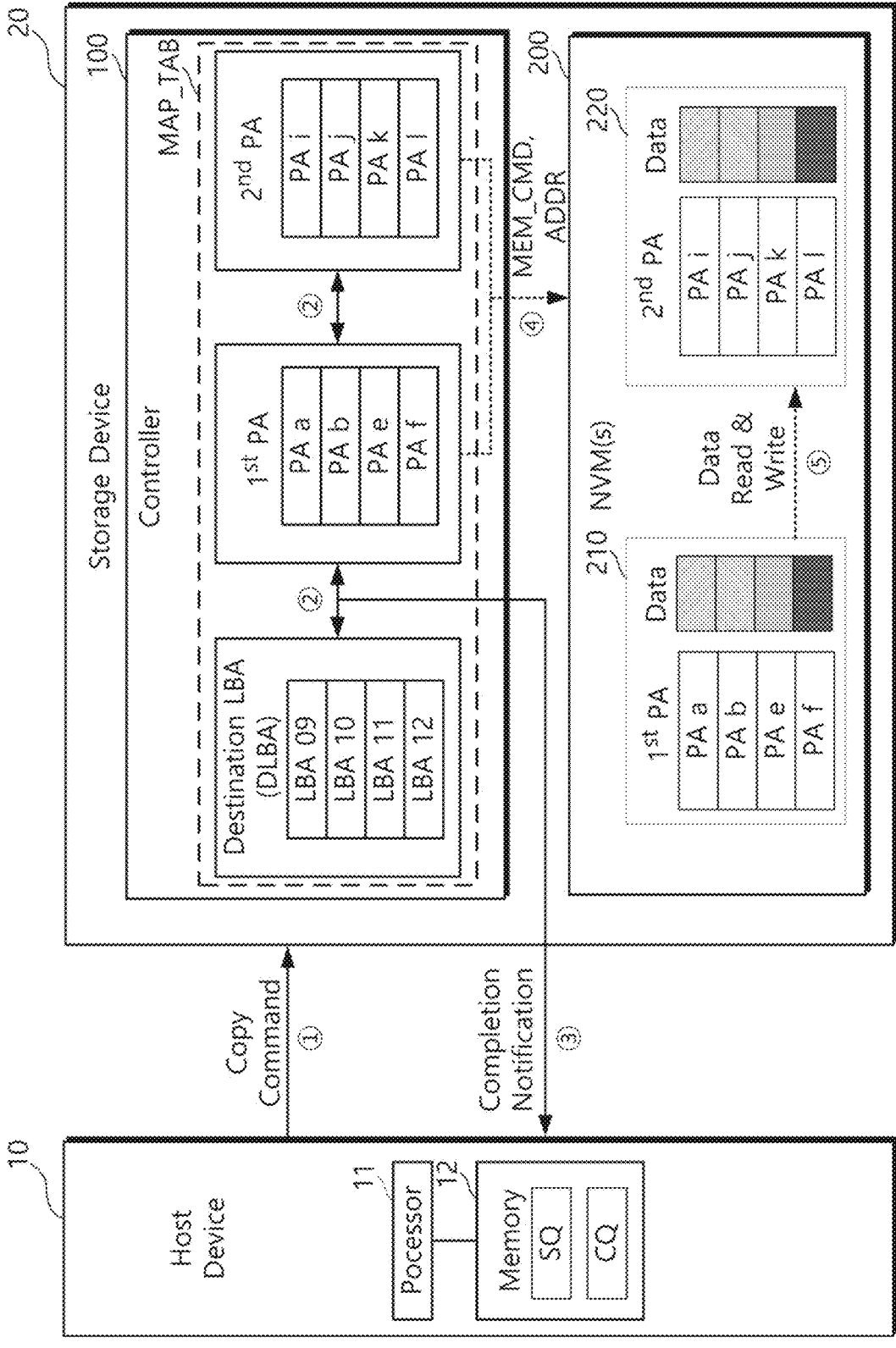
FIG. 1 is a diagram illustrating a storage device according to an embodiment.

FIG. 1 is a diagram illustrating a storage device 20 according to an embodiment. The storage device 20 may complete the update of a mapping table associated with a copy command and may then notify a host device 10 that the copy command is completely executed. After the storage device 20 notifies the host device 10 that the copy command is completely executed, the storage device 20 may internally perform operations of reading and writing data such that the execution of the copy command is internally completed. That is, the storage device 20 may perform the data reading and writing operations associated with the copy command in the background, that is, without intervention of the host device 10. In other words, the host device 10 may not control the specific data reading and writing operations associated with the copy command.

Referring to FIG. 1, the storage device 20 may be electrically connected to the host device 10 and may include a controller 100 and at least one nonvolatile memory device 200. In the description that follows, references to "a nonvolatile memory device 200" or "the nonvolatile memory device 200" includes within its scope a plurality of nonvolatile memory devices 200.

The storage device 20 may be implemented to be physically separated from the host device 10 or may be implemented in a same package as the host device 10.

The storage device 20 may be coupled to the host device 10 such that it is possible to communicate with any other components of the host device 10 through a storage interface bus. The storage interface bus may be, for example, a peripheral component interconnect express (PCIe) bus. The host device 10 may exchange data with the storage device 20 through the storage interface bus by using a storage interface protocol. In an embodiment, the storage interface protocol may be, for example, non-volatile memory host controller express (NVMe).

The host device 10 may include a data center server, a cloud server, a personal computer, a laptop computer, etc. The host device 10 may be a computing device which includes a processor 11 configured to process data. The processor 11 of the host device 10 may be a central processing unit (CPU), an application-specific integrated circuit (ASIC), a field programmable gate array (FPGA), or any other type of processing device implemented by a software command, a micro code, and/or firmware. While one processor 11 is illustrated in FIG. 1, in some embodiments the processor 11 may include a plurality of processors.

The processor 11 of the host device 10 is connected to a memory device 12. The memory device 12 may include a static random access memory (SRAM), a dynamic random access memory (DRAM), etc.

The storage device 20 may function as a nonvolatile storage device which stores data regardless of whether a power is supplied and may provide a relatively large storage capacity compared to a memory device 12 of the host device 10.

The controller 100 may control the nonvolatile memory device 200 to process or perform a workload. The nonvolatile memory device 200 may write (or referred to as "store" or "program"), erase, and/or read data under control of the controller 100.

The nonvolatile memory device 200 may include a flash memory of a two-dimensional (2D) structure or a two-dimensional (3D) structure. The flash memory may include different kinds of nonvolatile memories such as a NAND flash memory, a vertical NAND (V-NAND) flash memory, a NOR flash memory, a magnetic RAM (MRAM), a phase-change RAM (PRAM), a ferroelectric random access memory (FRAM), a spin transfer torque random access memory (STT-RAM), and/or a resistive RAM (RRAM).

When the host device 10 and the storage device 20 communicate with each other based on the NVMe, the memory device 12 may include at least one submission queue SQ and at least one completion queue CQ. The host device 10 may transmit a command to the storage device 20 by using the submission queue SQ. That is, in an embodiment, the host device 10 may record a command (or an entry corresponding to the command) at the submission queue SQ which the storage device 20 is capable of accessing. After the host device 10 records the command, the host device 10 may notify the storage device 20 that a new command exists, by using a submission queue tail doorbell register of the controller 100 of the storage device 20. The storage device 20 may fetch the command from the submission queue SQ and may process the command. When the processing of the command is completed, the storage device 20 may record an entry at the completion queue CQ and may generate an interrupt. The host device 10 may process necessary tasks, and may record information indicating that the processing of the command is completed at a completion queue head doorbell register of the controller 100 of the storage device 20.

In an embodiment, some of commands transmitted from the host device 10 may be decomposed and executed into at least one internal command executable by the storage device 20. For example, the copy command may be decomposed into the read command and the write command and may then be internally executed.

After a related art storage device completes the execution of all internal operations for processing a command, the related art storage device notifies a host device that the processing of the command is completed, by recording a completion queue entry at the completion queue CQ. For example, when the related art storage device executes the read command and the write command being internal commands obtained by decomposing the copy command, the related storage device completes all the operations corresponding to the read command and the write command and then notifies a host device that the execution of the copy command is completed.

In contrast with the related art technology, the storage device 20 may perform the update of a mapping table MAP_TAB, which is associated with the copy command, and may then notify the host device 10 that the execution of the copy command is completed. In other words, in an embodiment, the storage device 20 may perform only the update of a mapping table MAP_TAB before notifying the host device 10 that the execution of the copy command is completed. That is, the storage device 20 may record an entry at the completion queue CQ before. Accordingly, the efficiency with which the copy command of the host device 10 is processed may be improved.

How the storage device 20 processes the copy command will be described in detail with reference to FIG. 1.

The host device 10 may transmit the copy command to the storage device 20 by using the submission queue SQ. For example, the host device 10 may record a submission queue entry SQE (refer to FIG. 2) at the submission queue SQ. The submission queue entry SQE may be implemented to include a first logical address being a logical address of at least one source range entry, a second logical address being a logical address of one destination range entry, and a first flag indicating a background copy. For example, in an embodiment, the first flag may be considered a background copy flag that tells the storage device 20 to use a background copy procedure for executing the copy command and thus, when the background copy flag is set, may indicate that a background copy procedure is to be implemented on the storage device 20 and when the background copy flag is not set may indicate that the background copy procedure is not to be implemented (i.e., a related art procedure is to be implemented in which all the operations corresponding to the read command and the write command being internal commands obtained by decomposing the copy command are to be completed before notifying the host device that the execution of the copy command is completed). The logical address may be a logical block address (LBA) being a logical block unit. In the specification, the first logical address being the logical address of the source range entry may be referred to as a "source LBA Src LBA". In the specification, the second logical address being the logical address of the destination range entry may be referred to as a "destination LBA DLBA".

The storage device 20 may parse the copy command and may perform processing based on the parsed copy command. For example, the copy command may request to copy data stored at source LBAs including at least one or more non-consecutive LBAs at destination LBAs DLBA including consecutive LBAs. The copy command may be used for garbage collection which the host device 10 designates, but embodiments are not limited thereto.

The storage device 20 may perform the update of the mapping table MAP_TAB, which corresponds to the copy command, by using a flash translation layer (FTL). The mapping table MAP_TAB may store information about a mapping relationship between logical addresses of the host device 10 and physical addresses of the storage device 20. The storage device 20 may map a first physical address $1^{st}$ PA on the destination LBA DLBA and may map a second physical address $2^{nd}$ PA on at least one of the destination LBA DLBA or the first physical address $1^{st}$ PA. That is, information about the correlation between the destination LBA DLBA, the first physical address $1^{st}$ PA, and the second physical address $2^{nd}$ PA may be stored in the mapping table MAP_TAB.

The first physical address $1^{st}$ PA may be a physical address mapped on the source LBA Src LBA. Accordingly, the first physical addresses $1^{st}$ PA may be non-consecutive. In the specification, logical addresses will be described by using numbers, and physical addresses will be described by using lowercase English letters. In the descriptions of the specification, non-consecutive numbers mean non-consecutive logical addresses, and consecutive numbers mean continuous logical addresses. Non-consecutive lowercase English letters mean non-consecutive physical addresses, and consecutive lowercase English letters mean continuous physical addresses. Referring to FIG. 1, the description will be given as the first physical addresses $1^{st}$ PA are PA a, PA b, PA e, or PA f. That is, the first physical addresses $1^{st}$ PA mapped on the source LBAs Src LBA before the copy command is executed may be non-consecutive physical addresses. The second physical address $2^{nd}$ PA is a physical address at which data of the first physical address $1^{st}$ PA are to be written as the copy command is executed. That is, according to the definition of the copy command, the second physical addresses $2^{nd}$ PA are consecutive physical addresses. Referring to FIG. 1, the second physical addresses $2^{nd}$ PA refer to physical addresses expressed by consecutive lowercase English letters of PA i, PA j, PA k, and PA l.

The storage device 20 performs the update of the mapping table MAP_TAB corresponding to the copy command and then notifies the host device 10 that the execution of the copy command is completed. For example, the storage device 20 may record (also referred to as "post") a completion queue entry CQE (refer to FIG. 2) associated with the copy command at the completion queue CQ and may issue an interrupt to the host device 10.

After the storage device 20 notifies the completion of the copy command to the host device 10, the storage device 20 may control the nonvolatile memory device 200 to execute the internal read command and the internal write command obtained by decomposing the copy command. That is, unlike the related art storage device which notifies the completion of the copy command after completing operations of updating a mapping table and executing an internal read command and an internal write command, the storage device 20 according to an embodiment notifies the completion of the copy command to the host device 10 immediately after performing the update of the mapping table MAP_TAB corresponding to the copy command. After the storage device 20 notifies the completion of the copy command to the host device 10, the storage device 20 may perform operations corresponding to the internal read command and the internal write command.

After notifying the completion of the copy command, the controller 100 of the storage device 20 may read data stored at the first physical address $1^{st}$ PA. The storage device 20 may provide the nonvolatile memory device 200 with an internal read and write command MEM_CMD and a related physical address ADDR such that the read data are written at the second physical address $2^{nd}$ PA.

Accordingly, the storage device 20 may execute the internal read command and the internal write command, which require a time during the processing operation of the copy command after the completion notification of the copy command, in the background, that is, without intervention of the host device 10, and thus, the copy command may be efficiently processed. In the specification, unlike a related art operation of processing the copy command, an operation of processing the copy command by performing operations corresponding to the internal read and write commands associated with the copy command after the completion notification of the copy command is referred to as a "background copy" and will be described in more detail below.

Figure 2:
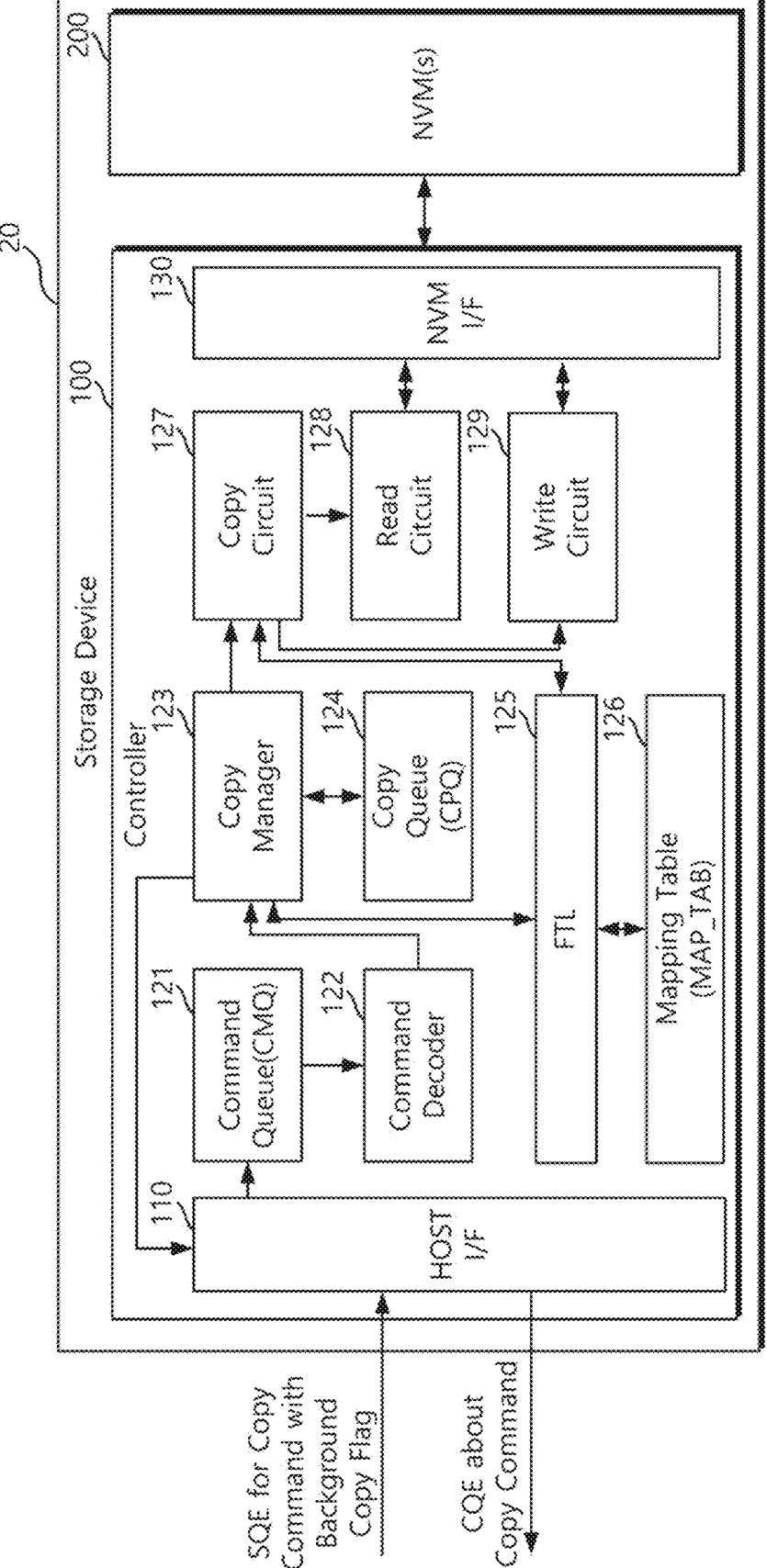
FIG. 2 is a diagram illustrating a configuration of a controller of a storage device according to an embodiment.

FIG. 2 is a diagram illustrating an example configuration of the storage device 20 according to an embodiment. Referring to FIG. 2, the storage device 20 may include the controller 100 and the at least one nonvolatile memory device (NVM(s)) 200.

The controller 100 may include a host interface (I/F) 110, a command queue (CMQ) 121, a command decoder 122, a copy manager 123, a copy queue (CPQ) 124, a flash translation layer (FTL) 125, a mapping table (MAP_TAB) 126, a copy circuit 127, a read circuit 128, a write circuit 129, and a nonvolatile memory interface (I/F) 130. In some embodiments, the controller 100 may further include a working memory (not illustrated) on which firmware is loaded.

The host interface (I/F) 110 of the controller 100 may receive the submission queue entry SQE associated with the copy command from the host device 10. The reception of the submission queue entry SQE of the host interface 110 may be implemented by fetching the submission queue entry SQE from the submission queue SQ. A background copy flag of the submission queue entry SQE associated with the copy command may be set. That is, an address corresponding to the background copy flag of the submission queue entry SQE may be set to "1h". The submission queue entry SQE whose background copy flag is set may allow the storage device 20 to execute the internal read and write commands of the copy command in the background, that is, without intervention of the host device 10.

The host interface (I/F) 110 may be implemented with various interfaces such as an advanced technology attachment (ATA) interface, a serial ATA (SATA) interface, an external SATA (e-SATA) interface, a small computer small interface (SCSI), a serial attached SCSI (SAS), a peripheral component interconnection (PCI) interface, a PCI express (PCIe) interface, an IEEE 1394 interface, a universal serial bus (USB) interface, and a non-volatile host controller express (NVMe) interface. For example, in some embodiments, the controller 100 may receive a command complying with the NVMe standard protocol and may transmit a response to the host device 10.

The command queue (CMQ) 121 may manage the received submission queue entry SQE in a queue structure. The command decoder 122 may parse the submission queue entry SQE stored in the command queue 121 and may generate a copy descriptor based on information of the copy command parsed from the submission queue entry SQE. The command decoder 122 may generate the copy descriptor based on the source LBA Src LBA and the destination LBA DLBA included in the submission queue entry SQE associated with the copy command. The command decoder 122 may provide the copy descriptor to the copy manager 123.

The copy manager 123 may insert and manage the copy descriptor into the copy queue 124. The command decoder 122 may generate the copy descriptors for respective submission queue entries SQE of a plurality of different copy commands stored in the command queue 121 at different points in time. The copy manager 123 may insert the plurality of copy descriptors thus generated into the copy queue 124 (CPQ) in sequence.

According to an embodiment, the copy queue (CPQ) 124 may include a plurality of copy queues. In an embodiment, a copy descriptor generated from a copy command associated with the background copy and a copy descriptor generated from a copy command not associated with the background copy may be inserted into different copy queues 124. In this case, the copy command associated with the background copy may be processed in the background without intervention of the host device 10. The copy command not associated with the background copy may be processed in the foreground with intervention of the host device 10.

According to an embodiment, the copy queue (CPQ) 124 may only include one kind of copy descriptor, that is, the copy descriptor generated from the copy command associated with the background copy or the copy descriptor generated from the copy command not associated with the background copy. For example, while operations corresponding to the internal read command and the internal write command are performed based on the copy descriptors generated from the copy commands associated with the background copy, the copy command not associated with the background copy may be received. In this case, the copy manager 123 may perform the operations corresponding to the internal read command and the internal write command in the foreground by flushing all the copy descriptors associated with the background copy, which are stored in the copy queue 124.

The copy manager 123 may transfer the source LBA Src LBA and the destination LBA DLBA to the flash translation layer (FTL) 125 with reference to the copy descriptor of the copy queue 124 and may direct the update of the mapping table 125.

The flash translation layer (FTL) 125 may perform various functions (or operations) such as address mapping, wear-leveling, and garbage collection. The address mapping operation refers to an operation of translating a logical address received from a host into a physical address to be used to actually store the data in the nonvolatile memory device 200. The wear-leveling which is a technology for allowing blocks of the nonvolatile memory device 200 to be used uniformly such that excessive deterioration of a specific block is prevented may be implemented, for example, through a firmware technology for balancing erase counts of physical blocks. The garbage collection refers to a technology for securing an available capacity of the nonvolatile memory device 200 through a way to copy valid data of an existing block to a new block and erase the existing block.

The flash translation layer (FTL) 125 may update the mapping table 126 by mapping the first physical address $1^{st}$ PA mapped on the source LBA Src LBA on the destination LBA DLBA. The flash translation layer 125 may allocate the second physical address $2^{nd}$ PA being a new physical address, to which data are to be copied, so as to correspond to the destination LBA DLBA and may update the mapping table 126 by mapping the second physical address $2^{nd}$ PA on the destination LBA DLBA and/or the first physical address $1^{st}$ PA.

The copy manager 123 may receive the notification indicating that the mapping table 126 is updated by the flash translation layer 125 and may control the host interface 110 such that the completion queue entry CQE associated with the copy command is transmitted to a host device (e.g., the host device 10 of FIG. 1). The transmission of the completion queue entry CQE of the host interface 110 may be to post the completion queue entry CQE to the completion queue CQ and to issue an interrupt to the host device.

After the completion queue entry CQE associated with the copy command is transmitted to the host device, the copy manager 123 may control the copy circuit 127 based on the copy descriptor stored in the copy queue 124 and may execute the internal read command and the internal write command.

The copy circuit 127 may control the read circuit 128 such that data are read from the first physical address $1^{st}$ PA and may control the write circuit 129 such that the read data are stored at the second physical address $2^{nd}$ PA. The read circuit 128 may read data by controlling the nonvolatile memory device 200 through the nonvolatile memory interface 130, and the write circuit 129 may write data by controlling the nonvolatile memory device 200 through the nonvolatile memory interface 130.

Figure 3:
FIG. 3 is a diagram illustrating a configuration of a submission queue entry used in a copy command supporting background copy, according to an embodiment.

FIG. 3 is a diagram illustrating a configuration of the submission queue entry SQE used in a copy command supporting background copy, according to an embodiment. The submission queue entry SQE will be described with reference to FIGS. 1, 2, and 3.

The storage device 20 may receive the copy command indicating the execution of the background copy from the host device 10. In an embodiment, the copy command may be the submission queue entry SQE illustrated in FIG. 3.

The submission queue entry SQE may include a first word (double word 0) DWORD0 in which a command identifier Command ID and an OPCODE indicating a copy command are stored. The command identifier Command ID may be an identifier for identifying a relevant submission queue entry SQE from a plurality of submission queue entries SQE included in the submission queue SQ.

The submission queue entry SQE may include a second word (double word 1) DWORD 1 in which a data pointer DPTR indicating a location (e.g., a memory of the host device 10) of data (e.g., data such as a source range entry SRE of FIG. 4) targeted for the copy command is stored. In an embodiment data pointer DPTR may be the first logical address described with reference to FIG. 1.

The submission queue entry SQE may include a third word (double word 2) DWORD 2 and a fourth word (double word 3) DWORD 3. A starting destination LBA (SDLBA) indicating a starting address of the destination LBA DLBA used as a destination location where data read from at least one source LBA Src LBA are to be written may be stored in the third word (double word 2) DWORD 2 and the fourth word (double word 3) DWORD 3 In an embodiment, the destination LBA DLBA may be the second logical address described with reference to FIG. 1.

The submission queue entry SQE may include a fifth word (double word 4) DWORD4. The number of ranges NR indicating the number of source range entries SRE capable of providing information about a data location and a data capacity may be stored in the fifth word (double word 4) DWORD4. Data may be used for one or more read operations of the copy command.

The submission queue entry SQE may include a sixth word (double word 5) DWORD5. A background copy flag BGCF indicating whether to execute the copy command based on the background copy may be stored in the sixth word (double word 5) DWORD5.

For example, in an embodiment, when the host device 10 requests to execute the copy command based on the background copy, the sixth word DWORD5 of the submission queue entry SQE may be set to "1h". When the host device 10 requests to execute the copy command which is not based on the background copy, the sixth word DWORD5 of the submission queue entry SQE may be set (or cleared) to "0h".

According to an embodiment, the command decoder 122 may set the background copy flag BGCF of the copy descriptor with reference to the background copy flag BGCF stored in the sixth word DWORD5 of the submission queue entry SQE.

The first logical address which the data pointer DPTR of the submission queue entry SQE indicates may be associated with a first logical space identified by a first identifier. The second logical address which is the destination LBA DLBA of the submission queue entry SQE may be associated with a second logical space identified by a second identifier. The first logical space and the second logical space may be located at a same location of the storage device 20. That is, in some embodiments, the background copy operation may be performed between different namespaces, as well as the same namespace.

In some embodiments, the submission queue entry SQE may include one or more additional words or fields associated with features such as retry, protection information, an indicator type, and a reference tag.

Figure 4:
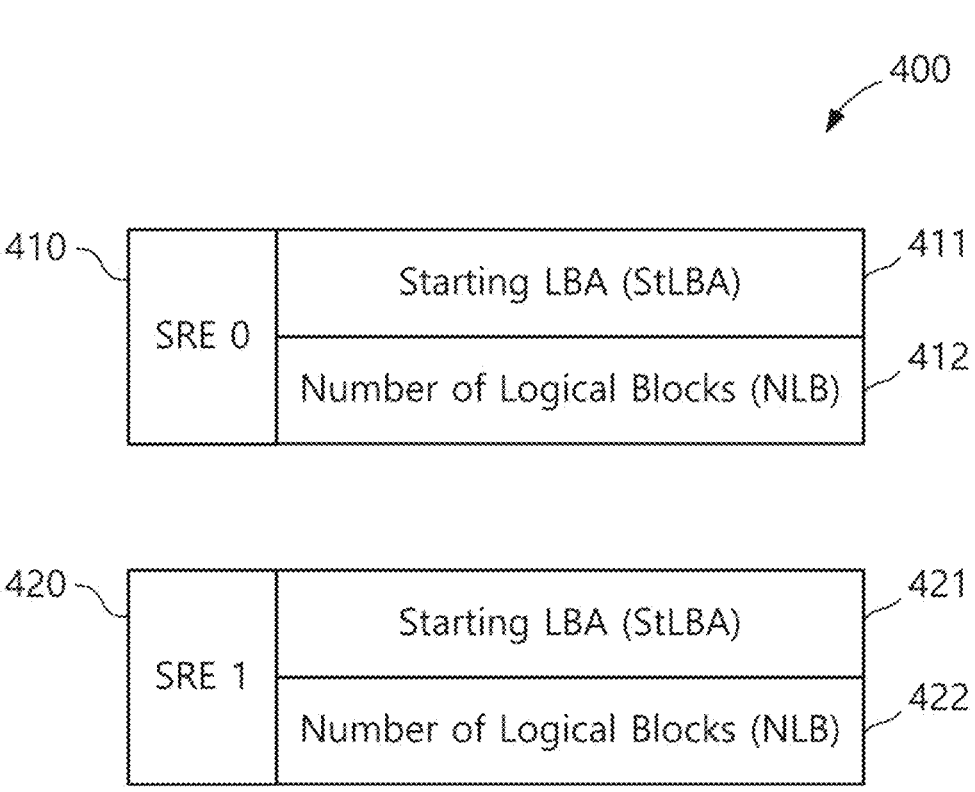
FIG. 4 is a diagram illustrating a configuration of a source range entry used in the copy command of FIG. 3, according to an embodiment.

FIG. 4 is a diagram illustrating a configuration of a source range entry 400 used in the copy command of FIG. 3, according to an embodiment. The source range entry 400 used in the copy command will be described with reference to FIGS. 2 and 4.

Referring to FIG. 4, the source range entry 400 may include one or more source range entries 410 and 420. The source range entry 410 may include a starting address (StLBA) 411 of the source LBA Src LBA and a number of logical blocks (NLB) 412 to be copied, and the source range entry 420 may include a starting address (StLBA) 421 of the source LBA Src LBA and a number of logical blocks (NLB) 422 to be copied. That is, the read operation may be performed on logical blocks corresponding to the number of logical blocks 412 to be copied from the starting address 411 of the source LBA Src LBA of the first source range entry (SRE 0) 410 and logical blocks corresponding to the number of logical blocks 422 to be copied from the starting address 421 of the source LBA Src LBA of the second source range entry (SRE 1) 420, and data read through the read operation may be written at the destination LBA DLBA. To write data at the destination LBA DLBA may be to write data at the second physical address $2^{nd}$ PA mapped on the destination LBA DLBA.

In an embodiment, the logical blocks indicated by the first source range entry (SRE 0) 410 and the logical blocks indicated by the second source range entry (SRE 1) 420 may not be located at consecutive logical block addresses. For example, in the first source range entry (SRE 0) 410, the starting address StLBA of the source LBA Src LBA may indicate LBA 01, and the number of logical blocks (NLB) 412 may indicate 2. In this case, the first source range entry (SRE 0) 410 may indicate LBA 01 and LBA 02. In the second source range entry (SRE 1) 420, the starting address StLBA of the source LBA Src LBA may indicate LBA 05, and the number of logical blocks (NLB) 422 may indicate 2. In this case, the second source range entry (SRE 1) 420 may indicate LBA 05 and LBA 06.

The command decoder 122 may generate the copy descriptors based on the one or more source range entries 410 and 420. The copy descriptor will be described with reference to FIG. 5.

Figure 5:
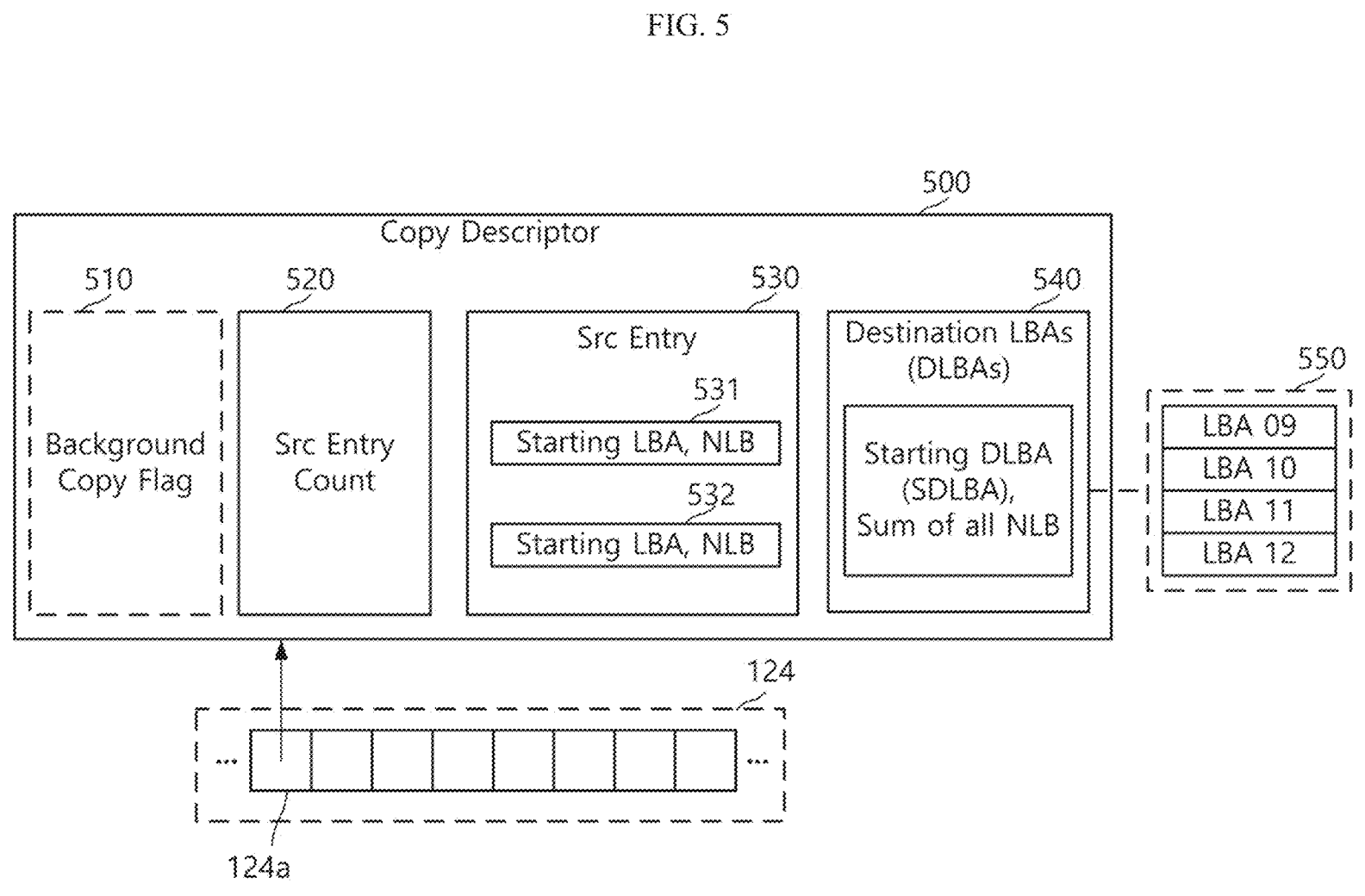

FIG. 5 is a diagram illustrating a copy descriptor 500 inserted into the copy queue 124 of the controller 100 according to an embodiment. The copy descriptor 500 will be described with reference to FIGS. 2, 3, 4, and 5.

Referring to FIG. 5, in an embodiment, the copy queue 124 may include a plurality of cells, and information indicating each of the copy descriptors 500 may be stored in each cell. For example, information indicating each of the copy descriptors 500 may be an address in which each of the copy descriptors 500 is stored. Alternatively, each of the copy descriptors 500 itself may be stored in each cell of the copy queue 124. For example, in an embodiment, one of the copy descriptors 500 may be stored in a cell 124a of the copy queue 124 as illustrated in FIG. 5. As described with reference to FIG. 2, the copy descriptor 500 may be generated based on the submission queue entry SQE associated with the copy command.

In an embodiment, the copy queue 124 may be a circular queue with a given size. In some embodiments, the copy queue 124 may be a linked queue. When the copy queue 124 is a queue with a given size, copy commands that are received in a state in which all the cells of the copy queue 124 are full may be blocked. That is, when an available space for storing a copy descriptor is insufficient in the copy queue 124, the storage device 20 may post the completion queue entry CQE whose completion flag is cleared to the completion queue CQ of the host device 10 in response to receiving the copy command.

The copy descriptor 500 may include a source (Src) entry count 520, a source (Src) entry 530, and destination LBAs (DLBAs) 540. According to an embodiment, a copy descriptor generated from a copy command associated with the background copy and a copy descriptor generated from a copy command not associated with the background copy may be managed by using different copy queues 124. In this case, the copy descriptor 500 generated from the copy command associated with the background copy may selectively include a background copy flag 510.

The source (Src) entry count 520 may mean the number of source range entries SRE included in the submission queue entry SQE of the copy command. The source range entry SRE included in the submission queue entry SQE may constitute a source entry. In each source range entry SRE described with reference to FIG. 4, the starting address StLBA of the source LBA and the number of logical blocks NLB to be copied may constitute a source entry 531/532.

The destination LBAs 540 may include a starting address (starting DLBA) SDLBA of a destination LBA and a sum of the numbers of logical blocks NLB to be copied of source entries. For example, the destination LBAs 540 may be set based on the third word (double word 2) DWORD2 and the fourth word (double word 3) DWORD3 where the SDLBA of the submission queue entry (SQE) 300 described with reference to FIG. 3 is stored and the fifth word (double word 4) DWORD4 where the number of source ranges NR indicating the number of source range entries SRE is stored.

The source (Src) entry 530 may be generated from the first source range entry (SRE 0) 410 indicating LBA 01 and LBA 02 and the second source range entry (SRE 1) 420 indicating LBA 05 and LBA 06, which are described with reference to FIG. 4. For example, the starting address SDLBA of the destination LBAs (DLBAs) 540 may indicate LBA 09, and the number of logical blocks NLB to be copied of the source entry may be 4. Accordingly, logical addresses indicated by the destination LBAs (DLBAs) 540 may be LBA 09, LBA 10, LBA 11, and LBA 12.

FIGS. 6A to 6C are diagrams illustrating how the mapping table MAP_TAB changes as the storage device 20 of FIG. 1 executes the copy command, according to some embodiments. The update of the mapping table (MAP_TAB) 126 will be described with reference to FIGS. 1, 2, 4, 5, and 6A to 6C. The copy command will be described with reference to FIGS. 6A and 6C as an example under the assumption that the source LBAs SLBA indicate LBA 01, LBA 02, LBA 05, and LBA 06 and the destination LBAs DLBA indicate LBA 09, LBA 10, LBA 11, and LBA 12.

FIG. 6A shows the mapping table (MAP_TAB) 126 which is not yet updated by the flash translation layer 125 of the storage device 20 receiving the copy command.

FIG. 6A shows an example of the mapping table (MAP_TAB) 126 in which the source LBAs SLBA LBA 01, LBA 02, LBA 05, and LBA 06 are mapped on first physical addresses PA a, PA b, PA e, and PA f. As described above, whether numbers of logical addresses are consecutive means whether logical addresses are consecutive, and whether lowercase English letters of physical addresses are consecutive means that physical addresses are consecutive. Because the mapping table (MAP_TAB) 126 is not yet updated, a physical address may not be mapped on the destination LBA DLBA. Previously stored data DT a, DT b, DT e, and DT f are present at the first physical addresses PA a, PA b, PA e, and PA f of the nonvolatile memory device 200, which are mapped on the source LBAs SLBA LBA 01, LBA 02, LBA 05, and LBA 06.

FIG. 6B shows the mapping table (MAP_TAB) 126 which is updated by the flash translation layer 125 of the storage device 20 receiving the copy command.

Referring to FIG. 6B, the flash translation layer 125 updates the mapping table (MAP_TAB) 126 by mapping the first physical addresses PA a, PA b, PA e, and PA f mapped on the source LBAs SLBA on the destination LBAs LBA 09, LBA 10, LBA 11, and LBA 12. The flash translation layer 125 updates the mapping table (MAP_TAB) 126 by mapping second physical addresses PA i, PA j, PA k, and PA l on the destination LBAs LBA 09, LBA 10, LBA 11, and LBA 12 and/or the first physical addresses PA a, PA b, PA e, and PA f. Some of the first physical addresses PA a, PA b, PA e, and PA f are non-consecutive physical addresses, and all the second physical addresses PA i, PA j, PA k, and PA l are consecutive physical addresses. Because operations corresponding to the internal read command and the internal write command obtained by decomposing the copy command are not performed, data are not yet written at the second physical addresses PA i, PA j, PA k, and PA l of the nonvolatile memory device 200.

The storage device 20 may update the mapping table (MAP_TAB) 126 as illustrated in FIG. 6B and may then notify the host device 10 that the execution of the copy command is completed.

After the storage device 20 notifies the host device 10 that the execution of the copy command is completed, the storage device 20 executes the internal read command and the internal write command obtained by decomposing the copy command in the background without intervention of the host device 10.

FIG. 6C shows the mapping table (MAP_TAB) 126 after the storage device 20 executes the internal read command and the internal write command in the background without intervention of the host device 10.

Referring to FIG. 6C, the flash translation layer 125 releases the first physical addresses PA a, PA b, PA e, and PA f mapped on the destination LBAs LBA 09, LBA 10, LBA 11, and LBA 12. The second physical addresses PA i, PA j, PA k, and PA l are mapped on the destination LBAs LBA 09, LBA 10, LBA 11, and LBA 12.

The copy circuit 127 of the controller 100 controls the read circuit 128 to read the data DT a, DT b, DT e, and DT f of the first physical addresses PA a, PA b, PA e, and PA f of the nonvolatile memory device 200. The copy circuit 127 controls the write circuit 129 to write the read data DT a, DT b, DT e, and DT f at the second physical addresses PA i, PA j, PA k, and PA l of the nonvolatile memory device 200.

The description is given with reference to FIGS. 6A to 6C under the assumption that, even after the background copy is completed, the first physical addresses PA a, PA b, PA e, and PA f are mapped on source LBAs SLBA and data are still present at the first physical addresses PA a, PA b, PA e, and PA f of the nonvolatile memory device 200. According to an embodiment, after the background copy is completed, the first physical addresses PA a, PA b, PA e, and PA f mapped on the source LBAs SLBA may be released, and the first physical addresses PA a, PA b, PA e, and PA f of the nonvolatile memory device 200 may be set to "unavailable".

Figure 7:
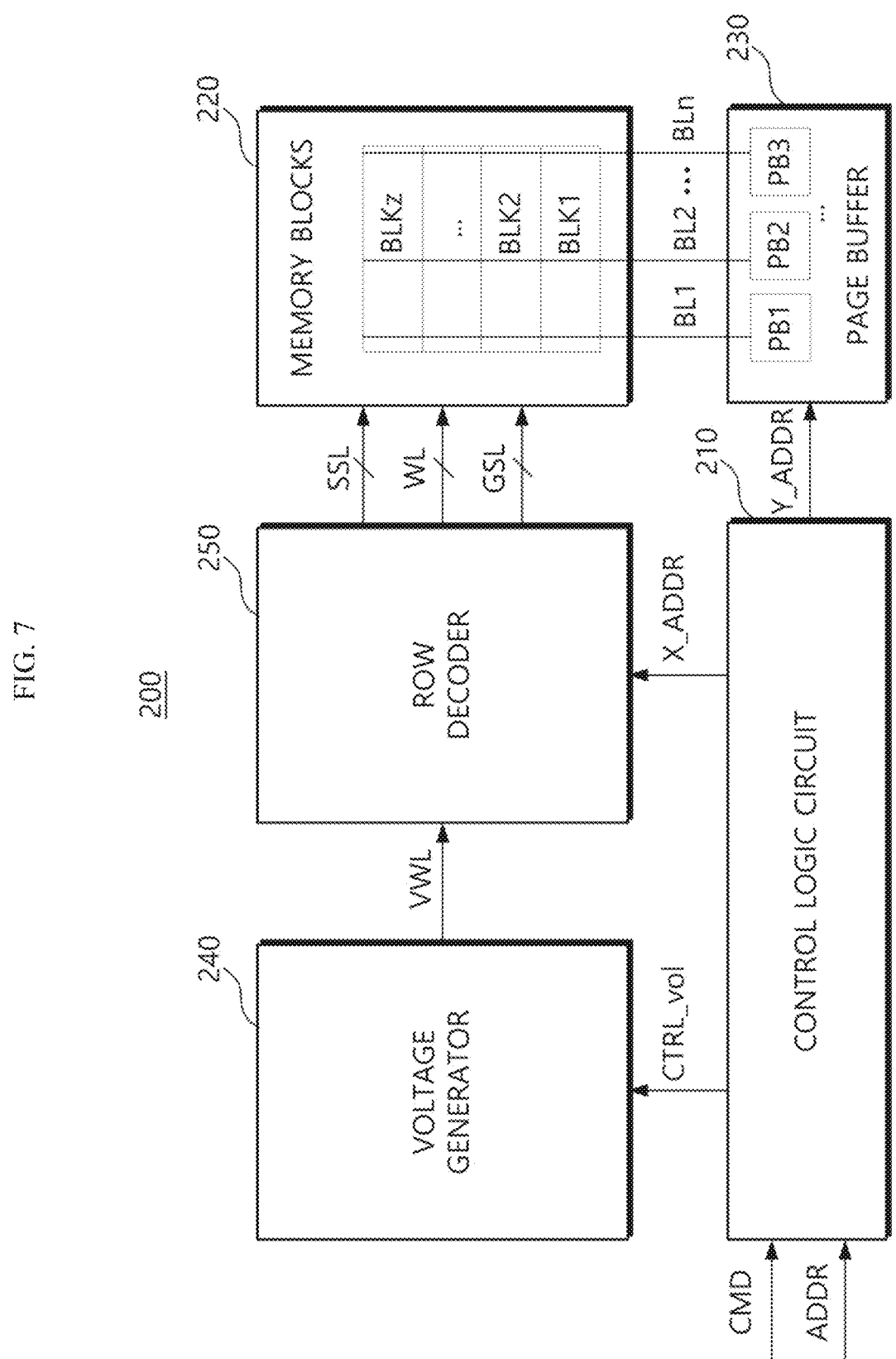
FIG. 7 is a diagram illustrating a configuration of the storage device of FIG. 1, according to an embodiment.

FIG. 7 is a diagram illustrating a configuration of the nonvolatile memory device 200 of the storage device 20 according to an embodiment.

The nonvolatile memory device 200 may include a control logic circuit 210, memory blocks 220, a page buffer 230, a voltage generator 240, and a row decoder 250. Although not illustrated in FIG. 7, in some embodiments, the non-volatile memory device 200 may include components of a memory device of a solid state drive, such as a memory interface circuit, column logic, a pre-decoder, a temperature sensor, a command decoder, and an address decoder.

The control logic circuit 210 may overall control various kinds of operations of the nonvolatile memory device 200. The control logic circuit 210 may output various kinds of control signals in response to the command CMD and/or the physical address ADDR from the memory interface circuit. For example, the control signals may include a voltage control signal CTRL_vol, a row address X_ADDR, and a column address Y_ADDR.

The command CMD may include the internal read command and/or the internal write command obtained by decomposing the copy command. The address ADDR corresponding to the command CMD may be the first physical address or the second physical address described with reference to FIGS. 6A-6C. The control logic circuit 210 reads pieces of data of the first physical address in response to the internal read command. The control logic circuit 210 writes the read data at the second physical address in response to the internal write command.

The memory blocks 220 may include a plurality of memory blocks BLK1 to BLKz (z being a positive integer), and each of the plurality of memory blocks BLK1 to BLKz may include a plurality of memory cells. The memory blocks 220 may be connected to the page buffer 230 through bit lines BL1 to BLn and may be connected to the row decoder 250 through word lines WL, string selection lines SSL, and ground selection lines GSL.

The page buffer 230 may include a plurality of page buffers PB1 to PBn (n being an integer of 3 or more), and the plurality of page buffers PB1 to PBn may be respectively connected to memory cells through the bit lines BL1 to BLn. The page buffer 230 may select at least one bit line among the bit lines BL1 to BLn in response to the column address Y_ADDR. The page buffer 230 may operate as a write driver or a sense amplifiers depending on an operation mode. For example, in the program (or write) operation, the page buffer 230 may apply a bit line voltage corresponding to data to be programmed to a selected bit line. In the read operation, the page buffer 230 may sense a current or a voltage of the selected bit line to read data stored in a memory cell.

The voltage generator 240 may generate various kinds of voltages for performing the program, read, and erase operations based on the voltage control signal CTRL_vol.

In response to the row address X_ADDR, the row decoder 250 may select one of the plurality of word lines WL and may select one of the plurality of string selection lines SSL.

Figure 8:
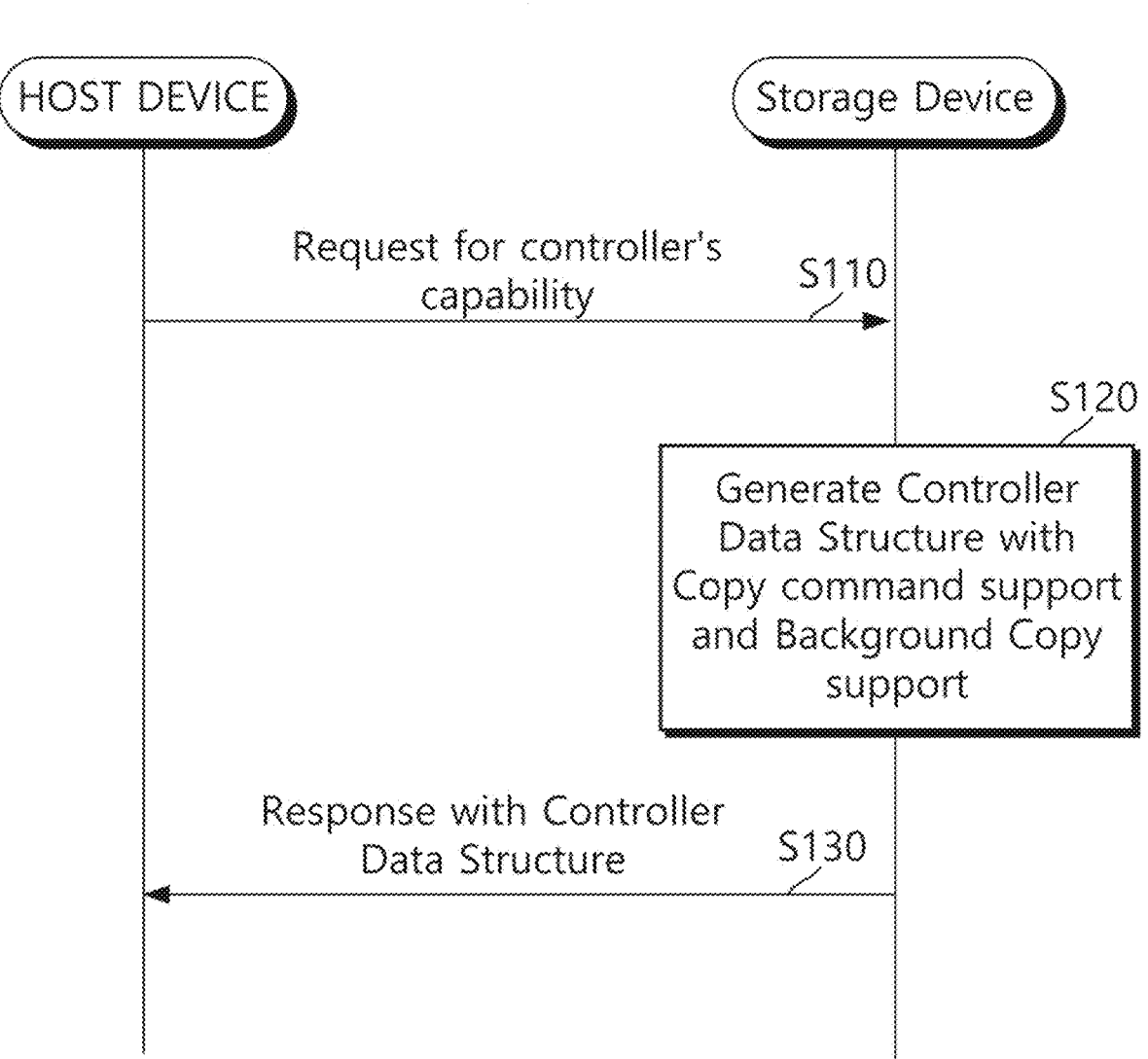
FIG. 8 is a diagram describing an operation of notifying a host device whether a background copy function is supported, in an operating method of a storage device according to an embodiment.

FIG. 8 is a diagram describing an operation of notifying a host device whether a background copy function is supported, in an operating method of a storage device according to an embodiment.

In operation S110, the host device may request a capability, which a controller of the storage device supports, from the storage device. In an embodiment, the request of the capability supported by the controller may be accomplished by transmitting an identify command of the NVMe to the storage device. That is, the host device may post the submission queue entry SQE to the submission queue SQ in response to the identify command and may notify the storage device that the identify command exists, by using the submission queue tail doorbell register. The submission queue entry SQE of the identify command may include a data pointer indicating a starting address of a data buffer.

In operation S120, the storage device may generate a controller data structure in response to the identify command. One field of the controller data structure may include a code indicating whether to support the copy command and whether to support a background copy operation. For example, the storage device may set a bit (e.g., a copy command flag) of a field indicating whether to support the copy command to "1h" and may set a bit (e.g., a background copy flag) of a field indicating whether to support the background copy operation to "1h". In this case, the storage device may provide the host device with a response indicating that both the copy command and the background copy operation are supported.

In operation S130, the storage device may transmit a response including the controller data structure to the host device. For example, in some embodiments, the storage device may store an address at which the generated controller data structure is located in a data buffer, may post the completion queue entry CQE to the completion queue CQ, and may issue an interrupt to the host device.

Accordingly, after the host device parses and checks the received controller data structure, the host device may transmit the copy command, in which the background copy flag is set (e.g., set to "1h"), to the storage device such that the storage command processes the copy command in the background without intervention of the host device.

Figure 9:
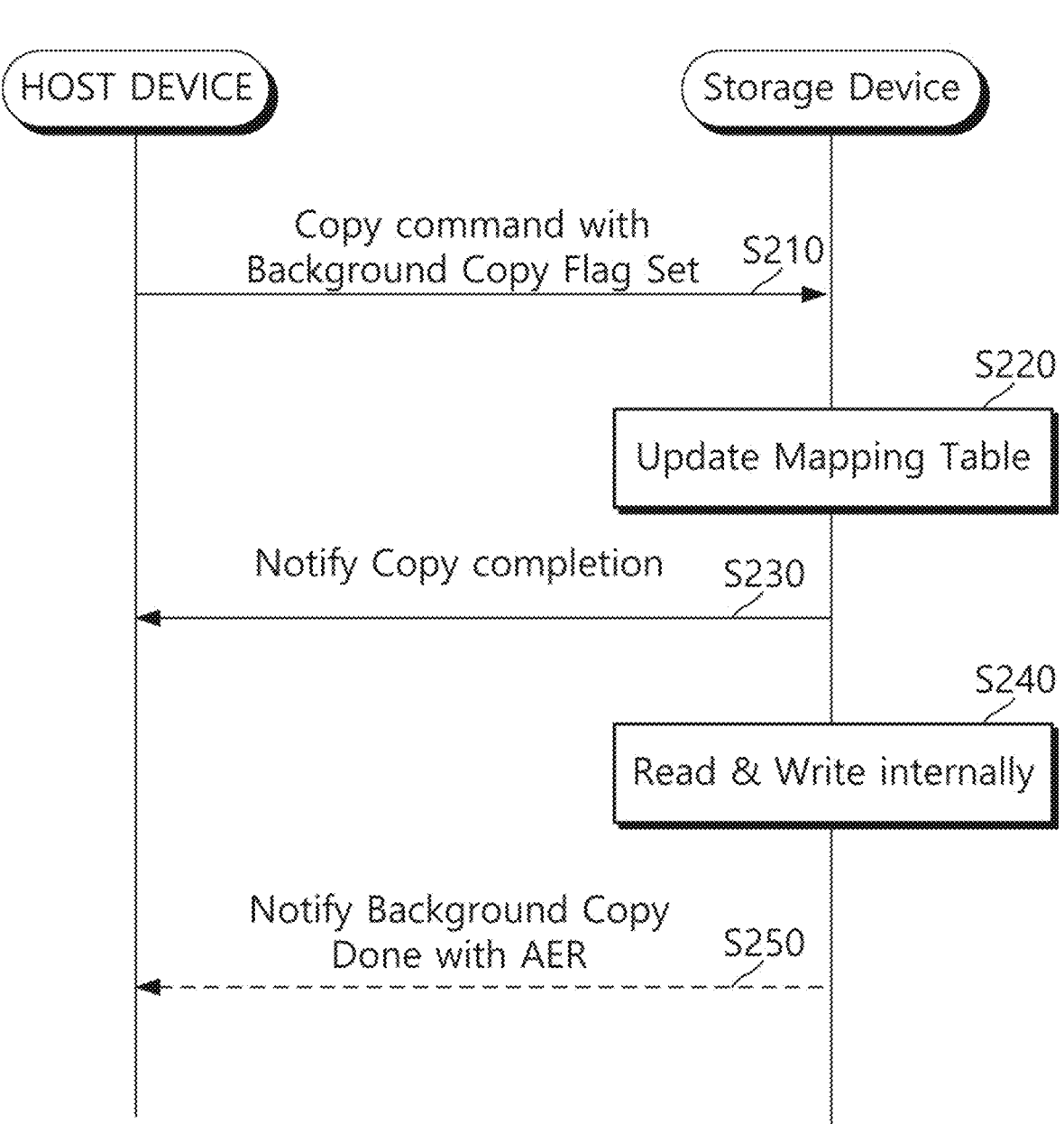
FIG. 9 is a diagram describing an operation of executing a copy command, in an operating method of a storage device according to an embodiment.

FIG. 9 is a diagram describing an operation of executing a copy command, in an operating method of a storage device according to an embodiment. The copy command may be executed by the storage device described with reference to FIGS. 1 to 7. Additional description which is the same as the description given with reference to FIGS. 1 to 7 will be omitted to avoid redundancy and for conciseness.

In operation S210, a host device may transmit a copy command, in which a background copy flag is set (e.g., set to "1h"), to a storage device. That is, the host device may post the submission queue entry SQE, in which the background copy flag is set (e.g., set to "1h") in association with the copy command, to the submission queue SQ. The host device may notify the storage device that the copy command exists, by using the submission queue tail doorbell register.

In operation S220, the storage device may update a mapping table in which logical addresses and physical addresses are mapped in a one-to-one correspondence, based on the submission queue entry SQE of the copy command, by using a flash translation layer (FTL). For example, the storage device may map a first physical address mapped on a first logical address being an address of a source range entry on a second logical address being a destination LBA. The storage device may allocate a second physical address where the data of the first physical address is to be written. The storage device may map the second physical address on the second logical address or the first physical address.

When the mapping table is successfully updated, in operation S230, the storage device may notify the host device of the copy completion. For example, the storage device may post the completion queue entry CQE, in which there is set a flag indicating that the execution of the copy command is completed, to the completion queue CQ.

In some embodiments, when the storage device is incapable of supporting the execution of the copy command with respect to a range of all blocks of source range entries and a range of all blocks of destination LBAs, the storage device may post the completion queue entry CQE, in which there is set a flag indicating that the execution of the copy command fails, to the completion queue CQ.

In operation S240, the storage device may perform operations corresponding to the internal read command and the internal write command based on the updated mapping table. The storage device may read data stored at the first physical address of the nonvolatile memory device and may write the read data at the second physical address of the nonvolatile memory device.

In some embodiments, in operation S250, the storage device may notify the host device that the execution of the internal read command and the internal write command are completed, by using an asynchronous event request (AER). In some embodiments, operation S250 may be omitted.

Figure 10:
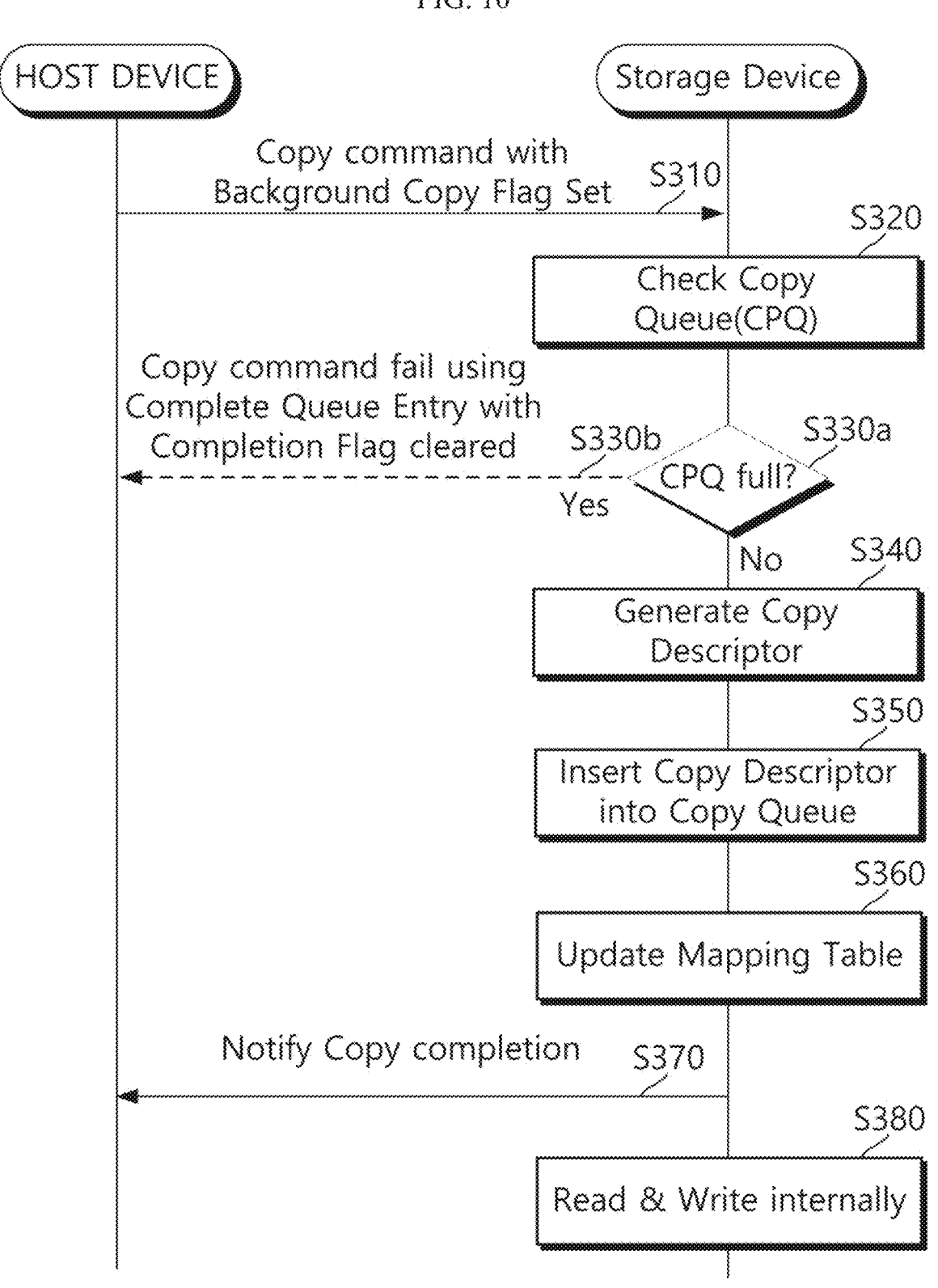
FIG. 10 is a diagram describing a copy command executing operation, in an operating method of a storage device according to an embodiment.

FIG. 10 is a diagram describing a copy command executing operation according to an embodiment, in an operating method of a storage device according to an embodiment. Additional description which is the same as the description given with reference to FIG. 9 will be omitted to avoid redundancy and for conciseness.

In operation S310, a host device may transmit a copy command, in which a background copy flag is set (e.g., set to "1h"), to a storage device.

In operation S320, the storage device may check the copy queue (CPQ) 124. For example, the storage device may check whether the copy queue (CPQ) 124 has available space for storing a copy descriptor. That is, the storage device may check whether a free space capable of storing a copy descriptor is present in the copy queue (CPQ) 124.

In operation S330a, the storage device may determine whether the CPQ is full. When a result of checking whether the copy queue (CPQ) 124 is available indicates that the copy queue (CPQ) 124 is full due to copy descriptors generated by the previous copy commands (e.g., copy commands in which the background copy flag is set) (operation S330a, Yes), the storage device may post the completion queue entry CQE, in which a completion flag indicating that the execution of the copy command fails is set (e.g., set to "0h"), to the completion queue CQ in operation S330b.

When the result of checking whether the copy queue (CPQ) 124 is available indicates that the copy queue (CPQ) 124 is not full and has available space to store the copy descriptors generated by the previous copy commands (e.g., copy commands in which the background copy flag is set) (operation S330a, No), the storage device may generate a copy descriptor in operation S340. For example, the storage device may generate the copy descriptor. The copy descriptor may be generated based on the submission queue entry SQE corresponding to the copy command of the host device.

In operation S350, the storage device may insert the generated copy descriptor into the copy queue (CPQ) 124. When the copy queue (CPQ) 124 is a circular queue, the storage device may update locations of a queue header and a queue tail based on the location where the copy descriptor is newly inserted.

In operation S360, the storage device may update the mapping table.

In operation S370, the storage device may notify the host device of the copy completion. For example, the storage device may post the completion queue entry CQE, in which a flag indicating that the execution of the copy command is completed is set, to the completion queue CQ.

In operation S380, the storage device may perform operations corresponding to the internal read command and the internal write command based on the updated mapping table.

A copy command executing operation of a storage device may include setting the copy queue (CPQ) 124 to such an extent as to be executable in the background in light of the resources of the storage device and may prevent/block a copy command, in which a background copy flag is set, when the copy queue (CPQ) 124 is full. Accordingly, a copy command in which a background copy flag is set may be prevented from being excessively executed. This configuration may mean that the storage device is prevented from falling into an operation-impossible state or from being overloaded.

Figure 11:
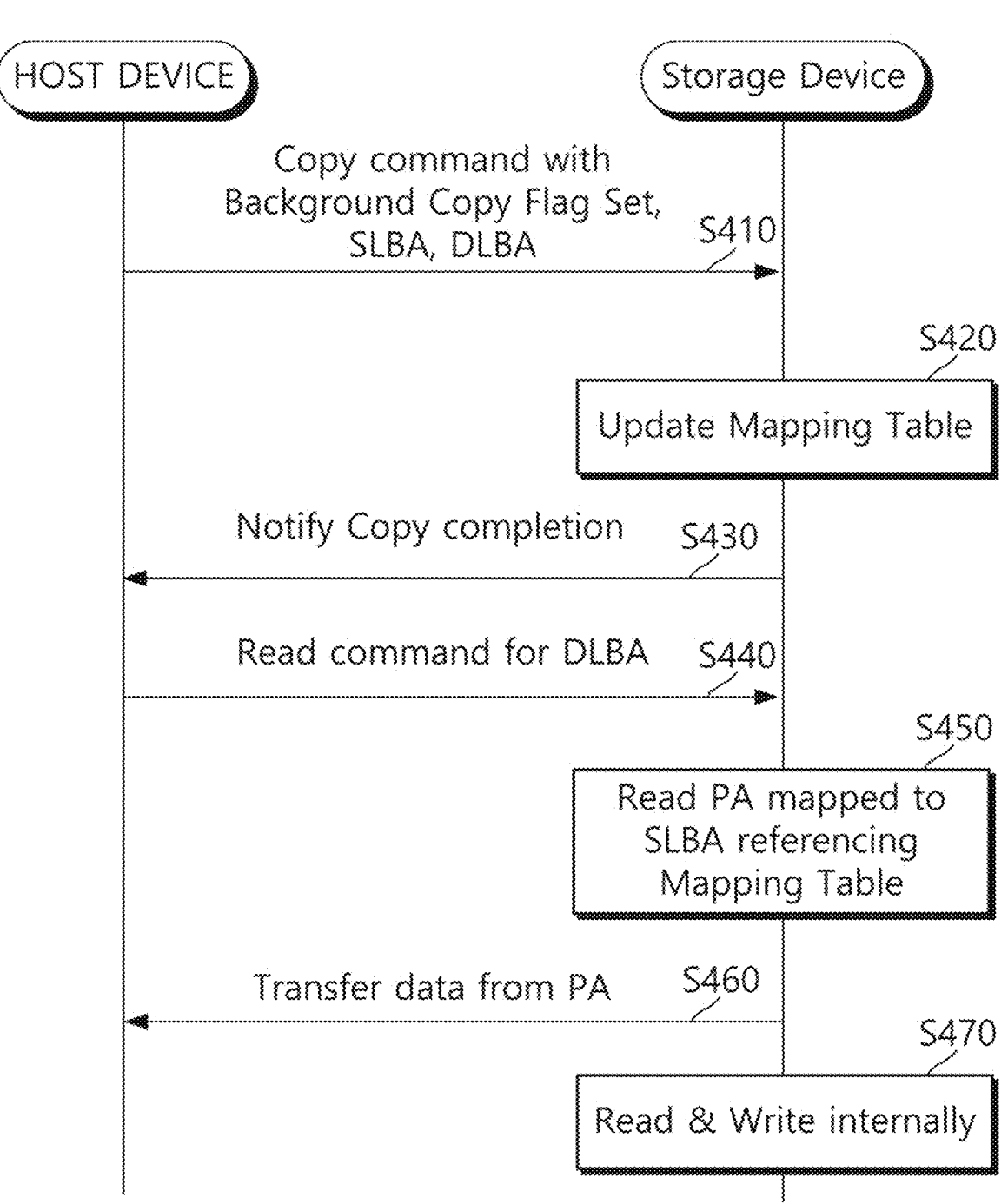
FIG. 11 is a diagram illustrating an operation of processing an exception while executing a copy command, in an operating method of a storage device, according to an embodiment.

FIG. 11 is a diagram illustrating an operation of processing an exception while executing a copy command, in an operating method of a storage device, according to an embodiment. Additional description which is the same as the description given with reference to FIGS. 8 to 10 will be omitted to avoid redundancy and for conciseness.

In operation S410, a host device may transmit a copy command, in which a background copy flag is set (e.g., set to "1h"), to a storage device. The copy command may include a source LBA SLBA indicating a source range entry and a destination LBA DLBA being a logical address at which data are to be copied. That is, a background copy flag of the submission queue entry SQE corresponding to the copy command may be set, and the submission queue entry SQE may include the source LBA SLBA and the destination LBA DLBA.

In operation S420, the storage device may update a mapping table.

In operation S430, the storage device may notify the host device of the copy completion. For example, the storage device may post the completion queue entry CQE, in which a flag indicating that the execution of the copy command is completed is set, to the completion queue CQ.

In operation S440, the storage device may receive a read command for reading data from the destination LBA DLBA before the execution of the internal read and write commands corresponding to the copy command.

In operation S450, the storage device may check a physical address PA mapped on the source LBA SLBA with reference to the updated mapping table and may read data from the physical address PA of a nonvolatile memory device.

In operation S460, the storage device may transmit the data read from the physical address PA mapped on the source LBA SLBA of the nonvolatile memory device to the host device.

In operation S470, the storage device may perform operations corresponding to the internal read command and the internal write command based on the updated mapping table.

That is, after the storage device notifies the host device that the copy command is completely executed, the storage device may receive the read commands at different points in time, that is, before and/or after the operations corresponding to the internal read command and the internal write command are performed. The read commands received at different points in time may indicate the read operations on data of a same logical address. In this case, the storage device may read data stored at different physical addresses in response to the read commands and may transmit the read data to the host device.

According to an embodiment, the operation of processing the exception while executing the copy command may safely process the exception operation capable of occurring, by notifying the completion of the copy command to the host device before the internal read command and the internal write command are executed.

A storage device according to various embodiments may efficiently execute a copy command.

While the present disclosure has been described with reference to various embodiments, it will be apparent to those of ordinary skill in the art that various changes and modifications may be made thereto without departing from the spirit and scope of the present disclosure as set forth in the following claims.

What is claimed is:

1. An operating method of a storage device which includes a nonvolatile memory device and a controller controlling the nonvolatile memory device, the method comprising:

before receiving a first copy command:

receiving, by the controller from the host device, an identify command requesting a controller data structure;

based on the identify command, transmitting, by the controller to the host device, the controller data structure indicating that a copy command is supported and a background copy is supported;

posting, by the controller, a completion queue entry associated with the identify command to a completion queue of the host device;

based on the controller data structure indicating that the copy command and the background copy are supported, receiving, by the controller from a host device, a first logical address of at least one source range entry, a second logical address of one destination range entry, and the first copy command including a first flag that indicates the background copy is set;

based on the first flag indicating that the background copy is set, mapping, at the controller, a first physical address on the second logical address;

mapping, at the controller, a second physical address on at least one of the second logical address and the first physical address;

transmitting, by the controller to the host device, a first notification of a completion of the first copy command; and after the controller transmits the first notification, reading, at the nonvolatile memory device, first data stored at the first physical address and writing the first data at the second physical address.

2. The operating method of claim 1, wherein the transmitting includes:

posting, by the controller, a completion queue entry associated with the first copy command to a completion queue of the host device.

3. The operating method of claim 1, wherein the mapping of the first physical address on the second logical address includes:

mapping, at the controller, the first physical address, which is mapped on the first logical address, on the second logical address.

4. The operating method of claim 3, wherein at least a portion of the first physical address includes a plurality of non-consecutive physical addresses, and wherein the second physical address includes a plurality of consecutive physical addresses.

5. The operating method of claim 3, further comprising:

after the first notification is transmitted and before the first data is written at the second physical address, receiving, by the controller from the host device, a read command for the second logical address;

reading, at the nonvolatile memory device under control of the controller, the first data stored at the first physical address based on the read command; and transmitting, by the controller to the host device, the first data.

6. The operating method of claim 3, further comprising:

after the first notification is transmitted, receiving, by the controller from the host device, a first read command for the second logical address at a first point in time and a second read command for the second logical address at a second point in time that is different from the first point in time;

reading, at the nonvolatile memory device, data respectively stored at different physical addresses based on the first read command and the second read command; and transmitting, by the controller to the host device, the read data.

7. The operating method of claim 1, further comprising:

generating, at the controller, a first copy descriptor that is associated with the first copy command and that is based on the first copy command;

receiving, by the controller, a second copy command;

generating, at the controller, a second copy descriptor that is associated with the second copy command; and inserting, at the controller, the first copy descriptor and the second copy descriptor into a background copy queue in an order of receiving the first copy command and the second copy command, wherein each of the first copy command and the second copy command includes the first flag indicating that the background copy is set.

8. The operating method of claim 7, wherein each of the first copy descriptor and the second copy descriptor includes the first logical address and the second logical address.

9. The operating method of claim 7, further comprising:

receiving, by the controller from the host device, a third copy command;

checking, at the controller, an available space of the background copy queue; and when the available space of the background copy queue is insufficient to store the first copy descriptor and the second copy descriptor, posting, by the controller, a completion queue entry, in which a completion flag is cleared, to a completion queue of the host device, wherein the third copy command includes the first flag indicating that the background copy is set.

10. The operating method of claim 1, further comprising:

based on the first data being completely written at the second physical address, transmitting, by the controller to the host device, an asynchronous event request to notify the host device that the first data is completely written in response to the first copy command from the host device, wherein the first data is associated with the first copy command including the first flag that indicates the background copy is set.

11. The operating method of claim 1, wherein the first logical address is associated with a first logical space identified by a first identifier, the second logical address is associated with a second logical space identified by a second identifier, and the first logical space and the second logical space are located at the same location of the storage device.

12. A storage device comprising:

at least one nonvolatile memory device configured to store or read data; and a controller configured to control the at least one nonvolatile memory device and to execute a command provided from a host device, wherein the controller is configured to at least:

before receiving a first copy command:

receive, from the host device, an identify command requesting a controller data structure;

based on the identify command, transmit, to the host device, the controller data structure indicating that a copy command is supported and a background copy is supported;

posting a completion queue entry associated with the identify command to a completion queue of the host device;

based on the controller data structure indicating that the copy command and the background copy are supported, receive, from the host device, a first logical address of at least one source range entry, a second logical address of one destination range entry, and the first copy command including a first flag that indicates the background copy is set;

map a first physical address on the second logical address based on the first copy command;

map a second physical address on at least one of the second logical address and the first physical address;

transmit a first notification of a completion of the first copy command to the host device;

after the first notification is transmitted, read first data stored at the first physical address; and write the first data at the second physical address.

13. The storage device of claim 12, wherein the controller is configured to:

generate a first copy descriptor that is associated with the first copy command;

based on receiving a second copy command, generate a second copy descriptor associated with the second copy command; and insert the first copy descriptor and the second copy descriptor into a background copy queue in an order of receiving the first copy command and the second copy command, wherein each of the first copy command and the second copy command includes the first flag indicating that the background copy is set.

14. The storage device of claim 13, wherein each of the first copy descriptor and the second copy descriptor includes the first logical address and the second logical address.

15. The storage device of claim 13, wherein the controller is configured to:

based on receiving a third copy command, check an available space of the background copy queue; and when the available space is insufficient to store the first copy descriptor and the second copy descriptor, post a completion queue entry, in which a completion flag is cleared, to a completion queue of the host device, and wherein the third copy command includes the first flag indicating that the background copy is set.

16. The storage device of claim 12, wherein the controller is configured to:

based on the first data being completely written at the second physical address, transmit, to the host device, an asynchronous event request to notify the host device that the first data is completely written.

17. The storage device of claim 12, wherein the first logical address is associated with a first logical space identified by a first identifier, the second logical address is associated with a second logical space identified by a second identifier, and the first logical space and the second logical space are located at the same location of the storage device.

18. The storage device of claim 12 wherein the controller complies with an NVMe (Non-Volatile Memory Express) protocol.

19. A storage device comprising:

at least one nonvolatile memory device configured to store or read data; and a controller configured to control the at least one nonvolatile memory device and to execute a command provided from a host device, wherein the controller is configured to at least:

before receiving a copy command:

receive, from the host device, an identify command requesting a controller data structure;

based on the identify command, transmit, by the controller to the host device, the controller data structure indicating that a copy command is supported and a background copy is supported;

post a completion queue entry associated with the identify command to a completion queue of the host device;

based on the controller data structure indicating that the copy command and the background copy are supported, receive the copy command including a flag indicating that the background copy is set, from the host device;

based on the copy command, update a mapping table in which logical addresses and physical addresses are mapped in a one-to-one correspondence;

after updating the mapping table, transmit a complete notification of the copy command to the host device; and after transmitting the complete notification, control the at least one nonvolatile memory device to perform data read operations or data write operations corresponding to the copy command.

* * * * *